United States Patent
Mitsubayashi (10) Patent No.: US 8,312,295 B2
(45) Date of Patent: Nov. 13, 2012

(54) ACCESS KEY GENERATING APPARATUS AND INFORMATION PROCESSING APPARATUS

(75) Inventor: Hideki Mitsubayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 320 days.

(21) Appl. No.: 12/690,505

(22) Filed: Jan. 20, 2010

(65) Prior Publication Data

US 2010/0185826 A1 Jul. 22, 2010

(30) Foreign Application Priority Data

Jan. 21, 2009 (JP) ................................ 2009-010488

(51) Int. Cl.
*G06F 12/14* (2006.01)
(52) U.S. Cl. ........................................ 713/193; 711/164
(58) Field of Classification Search ................. 726/2, 17, 726/26, 28, 29, 30; 713/155, 161, 168, 169, 713/170, 186; 711/6, 202, 207, 206, 208, 711/E12.061, E12.058; 709/203, 217, 103, 709/228, 236, 225, 229; 380/42, 55, 58, 380/46

See application file for complete search history.

(56) References Cited

U.S. PATENT DOCUMENTS

| 2003/0105914 A1* | 6/2003 | Dearth et al. ...................... 711/6 |
| 2009/0182974 A1* | 7/2009 | Greiner et al. ................. 711/207 |
| 2009/0216921 A1 | 8/2009 | Saito et al. |

FOREIGN PATENT DOCUMENTS

| JP | 2005-528677 | 9/2005 |
| JP | 2008-250386 | 10/2008 |
| WO | WO 2007/129482 A1 | 11/2007 |

* cited by examiner

*Primary Examiner* — Brandon Hoffman
*Assistant Examiner* — Nega Woldemariam
(74) *Attorney, Agent, or Firm* — Wolf, Greenfield & Sacks, P.C.

(57) ABSTRACT

An access key generating apparatus includes: a bit field converting unit which converts a partial bit field into a reduced bit field having a bit width shorter than a bit width of the partial bit field; an access key retaining unit which retains a plurality of access keys to control access to a memory from peripheral devices in association with each of the peripheral devices; and an indexing unit which indexes the access keys from the access key retaining unit using an index address including the reduced bit field if the conversion of the partial bit field into the reduced bit field is successful, and indexes the access keys from the access key retaining unit using an index address including the partial bit field if the conversion of the partial bit field into the reduced bit field is unsuccessful.

4 Claims, 9 Drawing Sheets

ACCESS KEY GENERATING APPARATUS AND INFORMATION PROCESSING APPARATUS

BACKGROUND OF THE INVENTION

1. Field of the Invention

The present invention relates to an access key generating apparatus, and more particularly, to an access key generating apparatus and an information processing apparatus, which are capable of generating an access key used to control memory access from a peripheral device.

2. Description of the Related Art

In a system in which an input/output address is mapped to a physical memory of a processor, when access to the memory is made from a peripheral device, if no restriction is provided, malicious user software may illegally access an address area. For example, such a problem may occur when a direct memory access controller (DMAC) is opened to user software. For the purpose of addressing this problem, for example, a processor cell (or Cell Broadband Engine) is provided with an address conversion table having pairs of access keys of 11 bits, which are possessed by a peripheral device, and address areas, which are accessible by the peripheral device. Since this address conversion table is set by privileged software, control is made to prevent the peripheral device from accessing an address area not permitted by the privileged software.

However, if such a control is implemented for a general bus system, the following problem may occur. That is, for example, in the case of a system using a peripheral component interconnect (PCI) bus, since each device identifier identifying devices in the system individually is composed of 16 bits, bit length is insufficient in an access key of 11 bits.

On the other hand, there are techniques that allocate device identifiers of peripheral devices as parts of an access key and address. For example, there has been proposed an information processing apparatus which determines whether or not access is permitted by using lower 11 bits of a device identifier as an access key and corresponding upper 5 bits to a segment number and a page number [for example, see Pamphlet of International Publication No. 2007/129482 (Pages 7 to 9)].

SUMMARY OF THE INVENTION

The above-mentioned related technique can adjust mismatches in bit number between device identifiers and access keys. However, in this related technique, since device identifiers having bit lengths exceeding the bit lengths of access keys are allocated to some of addresses, addresses usable by the peripheral devices may be limited. In addition, since some of devices identifiers which are unable to be freely set by software are addressed, an address conversion table to be set by privileged software may be complicated. Furthermore, since the relationship between device identifiers and access keys becomes fixed, it is difficult to grant the same key to a plurality of peripheral devices having different device identifiers.

In consideration of these circumstances, it is desirable to associate device identifiers with access keys without limiting addresses usable by peripheral devices.

According to an embodiment of the present invention, there is provided an access key generating apparatus including: a bit field converting unit which converts a partial bit field, as a portion of a bit field indicating a device identifier of peripheral devices, into a reduced bit field having a bit width shorter than a bit width of the partial bit field; an access key retaining unit which retains a plurality of access keys to control access to a memory from the peripheral devices in association with each of the peripheral devices; and an indexing unit which indexes the access keys from the access key retaining unit using an index address including the reduced bit field if the conversion of the partial bit field into the reduced bit field is successful, and indexes the access keys from the access key retaining unit using an index address including the partial bit field if the conversion of the partial bit field into the reduced bit field is unsuccessful. With this configuration, the access keys can be indexed based on the device identifier of the peripheral devices.

According to another embodiment of the present invention, there is provided an access key generating apparatus including: a bus number converting unit which converts a bus number, as a portion of a bit field indicating a device identifier of peripheral devices, into a reduced bus number having a bit width shorter than a bit width of the bus number; an access key retaining unit which retains a plurality of access keys to control access to a memory from the peripheral devices in association with each of the peripheral devices; and an indexing unit which indexes the access keys from the access key retaining unit using an index address including the reduced bus number if the conversion of the bus number into the reduced bus number is successful, and indexes the access keys from the access key retaining unit using an index address including the bus number if the conversion of the bus number into the reduced bus number is unsuccessful. With this configuration, the access keys can be indexed based on the device identifier of the peripheral devices.

In the another embodiment, the device identifier includes the bus number and a device number, and the indexing unit indexes the access keys from the access key retaining unit using an index address including the reduced bus number and the device number if the conversion of the bus number into the reduced bus number is successful, and indexes the access keys from the access key retaining unit using an index address including the bus number if the conversion of the bus number into the reduced bus number is unsuccessful. With this configuration, the access keys can be indexed by an index address depending on the kind of bus.

In the another embodiment, the device identifier includes the bus number, a device number and a function number, and the indexing unit indexes the access keys from a region of the access key retaining unit, the region being specified from the reduced bus number, the device number and the function number if the conversion of the bus number into the reduced bus number is successful, and indexes the access keys from a region of the access key retaining unit, the region being specified from the bus number and the function number if the conversion of the bus number into the reduced bus number is unsuccessful. With this configuration, the access keys can be indexed based on the device identifier including the function number.

In the another embodiment, the bus number converting unit includes a plurality of entries which retains the bus number, and the bus number converting unit determines that the conversion of the bus number into the reduced bus number is successful if the bus number to be converted is retained in one of the entries and then outputs a number uniquely granted to the one entry as the reduced bus number, and determines that the conversion of the bus number into the reduced bus number is unsuccessful if the bus number to be converted is not retained in any of the entries. With this configuration, it is possible to convert of the bus number into the reduced bus number depending on the retained bus number.

According to still another embodiment of the present invention, there is provided an information processing apparatus including: a bit field converting unit which converts a partial bit field, as a portion of a bit field indicating a device identifier of peripheral devices, into a reduced bit field having a bit width shorter than a bit width of the partial bit field; an access key retaining unit which retains a plurality of access keys to control access to a memory from the peripheral devices in association with each of the peripheral devices; an indexing unit which indexes the access keys from the access key retaining unit using an index address including the reduced bit field if the conversion of the partial bit field into the reduced bit field is successful, and indexes the access keys from the access key retaining unit using an index address including the partial bit field if the conversion of the partial bit field into the reduced bit field is unsuccessful; and a memory access control unit which uses the indexed access keys to control access to the memory. With this configuration, the access keys can be indexed based on the device identifier of the peripheral devices.

According to yet still another embodiment of the present invention, there is provided an information processing apparatus including: a bus number converting unit which converts a bus number, as a portion of a bit field indicating a device identifier of peripheral devices, into a reduced bus number having a bit width shorter than a bit width of the bus number; an access key retaining unit which retains a plurality of access keys to control access to a memory from the peripheral devices in association with each of the peripheral devices; an indexing unit which indexes the access keys from the access key retaining unit using an index address including the reduced bus number if the conversion of the bus number into the reduced bus number is successful, and indexes the access keys from the access key retaining unit using an index address including the bus number if the conversion of the bus number into the reduced bus number is unsuccessful; and a memory access control unit which uses the indexed access keys to control access to the memory. With this configuration, the access keys can be indexed based on the device identifier of the peripheral devices.

The above embodiments of the present invention provide a noticeable advantage of associating device identifiers with access keys without limiting addresses usable by peripheral devices.

DESCRIPTION OF THE PREFERRED EMBODIMENTS

Hereinafter, the best mode (referred hereinafter as embodiment) will be described in detail. The following description will be given in the order below:
1. First Embodiment (Example of Implementation of Information Processing System including PCI Devices and PCI-Express Devices)
2. Second Embodiment (Example of Implementation in General Information Processing System)

1. First Embodiment

[Example of General Configuration of Information Processing System]

Figure 1:
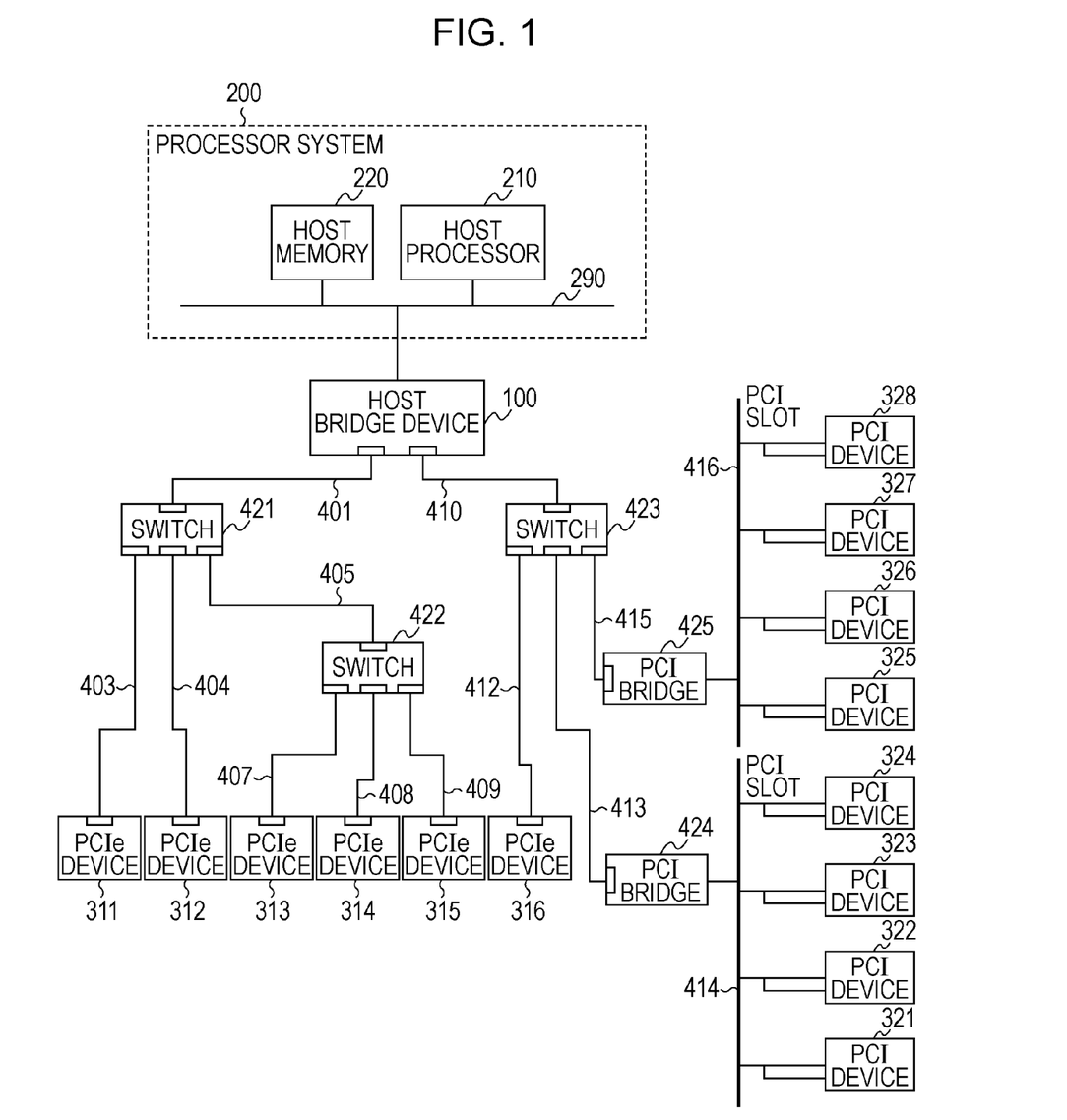
FIG. 1 is a diagram illustrating an example of the general configuration of an information processing system according to a first embodiment of the present invention.

FIG. 1 is a diagram illustrating an example of the general configuration of an information processing system according to a first embodiment of the present invention.

This information processing system includes PCI devices 321 to 328 and PCI-Express (hereinafter abbreviated as PCIe) devices 311 to 316 and is connected to a processor system 200 via a host bridge device 100. The processor system 200 includes a host processor 210, a host memory 220 and so on, which are connected via a processor bus 290. The host processor 210 is a processor which controls the entire configuration of information system. The host memory 220 is a memory which retains the programs, work area and so on used to operate the host processor 210. The processor bus 290 is connected with the host bridge device 100. In addition, the host processor 210 is an example of a memory access control unit recited in the claims and is here assumed to be a cell.

The host bridge device 100 is a bridge which implements intermediation between the processor system 200 and a PCIe bus. The host bridge device 100 is connected to the processor system 200 via the processor bus 290. In addition, the host bridge device 100 is connected to the PCI devices 321 to 328 and the PCIe devices 311 to 316 via a switch or another bridge, as will be described later.

In this example, switches 421 and 423 are connected to a device side of the host bridge device 100 via buses #1 401 and #10 410, respectively. Additionally, the switch 421 is connected with the PCIe devices 311 and 312 and a switch 422 via buses #3 403, #4 404 and #5 405, respectively. The switches 421 to 423 are to branch the PCIe bus. Additionally, the switch 422 is connected with the PCIe devices 313 to 315 via buses #7 407, #8 408 and #9 409, respectively. Additionally, the switch 423 is connected with the PCIe device 316 and PCI bridges 424 and 425 via buses #12 412, #13 413 and #15 415, respectively. The PCI bridges 424 and 425 are bridges which implement intermediation between the PCIe bus and the PCI bus. Additionally, the PCI bridge 424 is provided with a PCI slot and is connected with the PCI devices 321 to 324 via a bus #14 414. Additionally, the PCI bridge 425 is provided with a PCI slot and is connected with the PCI devices 325 to 328 via a bus #16 416.

The PCI devices are commonly connected to one PCI bus via a plurality of PCI slots. On the other hand, the PCIe devices employ a point-to-point connection scheme in which only a single PCIe device is connected to one PCIe bus.

[Example of Configuration of Host Bridge Device 100]

Figure 2:
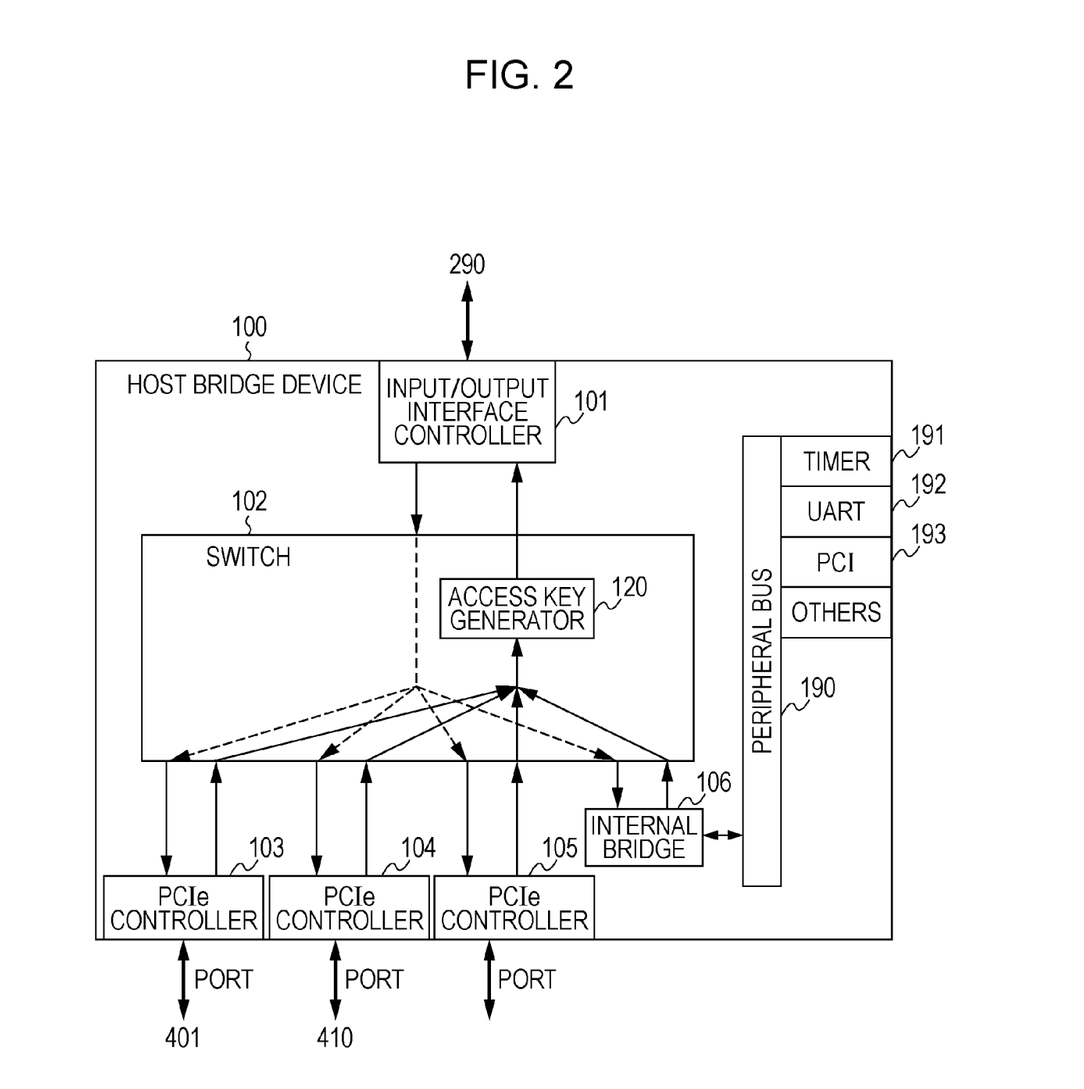
FIG. 2 is a diagram illustrating an example of the configuration of a host bridge device according to the first embodiment of the present invention.

FIG. 2 is a diagram illustrating an example of configuration of the host bridge device 100 according to the first embodiment of the present invention. The host bridge device 100 includes an input/output interface controller 101, a switch 102, PCIe controllers 103 to 105, an internal bridge 106 and a peripheral bus 190.

The input/output interface controller 101 is an interface with the processor bus 290 of the processor system 200. The switch 102 is to branch one port of the input/output interface controller 101 into a plurality of ports. In this example, this one port is assumed to be branched into the total 4 ports of 3 PCIe controllers 103 to 105 and the internal bridge 106. In addition, the switch 102 has an access key generating unit 120 which generates access keys based on input/output device identifiers from the PCI devices or the PCIe devices and supplies them to the input/output interface controller 101.

The PCIe controllers 103 to 105 connected to a port of the switch 102 are to control the PCIe bus. In this example, it is assumed that the bus #1 is connected to the PCIe controller 103, the bus #10 is connected to the PCIe controller 104 and none is connected to the PCIe controller 105.

The internal bridge 106 is connected to another port of the switch 102. The internal bridge 106 is a bridge which implements intermediation between the PCIe bus and the PCI bus and is connected to the peripheral bus 190 as the PCI bus. The peripheral bus 190 is a bus for connection to peripheral devices which may be, in this example, a timer 191, a serial interface UART (Universal Asynchronous Receiver Transmitter) 192, a PCI device 193 and so on.

[Field Configuration of Input/Output Device Identifier 710]

Figure 3:
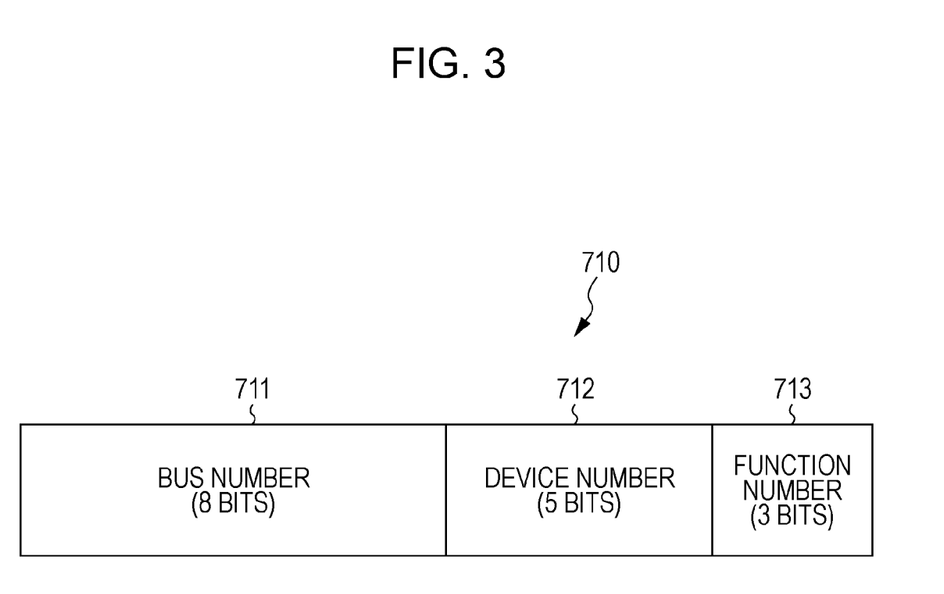
FIG. 3 is a diagram illustrating a field configuration of an input/output device identifier for identifying a PCI device and a PCIe device.

FIG. 3 is a diagram illustrating a field configuration of an input/output device identifier 710 for identifying PCI devices and PCIe devices. The input/output device identifier 710 includes fields of an 8-bit bus number 711, a 5-bit device number 712 and a 3-bit function number 713. The input/output device identifier 710 is a value determined depending on system configuration and is unable to be freely set by common user software.

The bus number 711 is a number of a PCI bus or a PCIe bus to which a device is directly connected. For example, in the example of FIG. 1, #1 is granted, as a bus number, to the bus 401.

The device number 712 is a device number for a PCI bus or a PCIe bus to which a device is directly connected. As described above, in the PCI bus, a plurality of PCI devices can be connected to one bus via a plurality of PCI slots and a plurality of device numbers is granted for each bus number. On the other hand, in the PCIe bus, since only a single PCIe device is connected to one PCIe bus, only a single device number is granted to one bus number.

The function number 713 is a number granted to each function of a device. For example, an input/output (I/O) controller hub is designed to connect a plurality of interfaces. In other words, for example, the input/output controller hub has various functions of a LPC (Low Pin Count) controller, an IDE (Integrated Drive Electronics) controller and a SATA (Serial Advanced Technology Attachment) controller for one PCI device. In this case, the input/output controller hub identifies various functions of the device by granting 3 function numbers #0 to #2 to the functions.

In this manner, the input/output device identifier for identifying the PCI devices and the PCIe devices is composed of 16 bits. On the other hand, since an access key of a processor cell is assumed to have 11 bits, the input/output device identifier is unable to be used as an access key as it is. Therefore, this embodiment allows the input/output device identifier to be used as an access key by converting a bit width of the input/output device identifier to be reduced.

In addition, the input/output device identifier 710 is an example of a device identifier recited in the claims.

[Conversion Mechanism of Input/Output Addresses]

Figure 4:
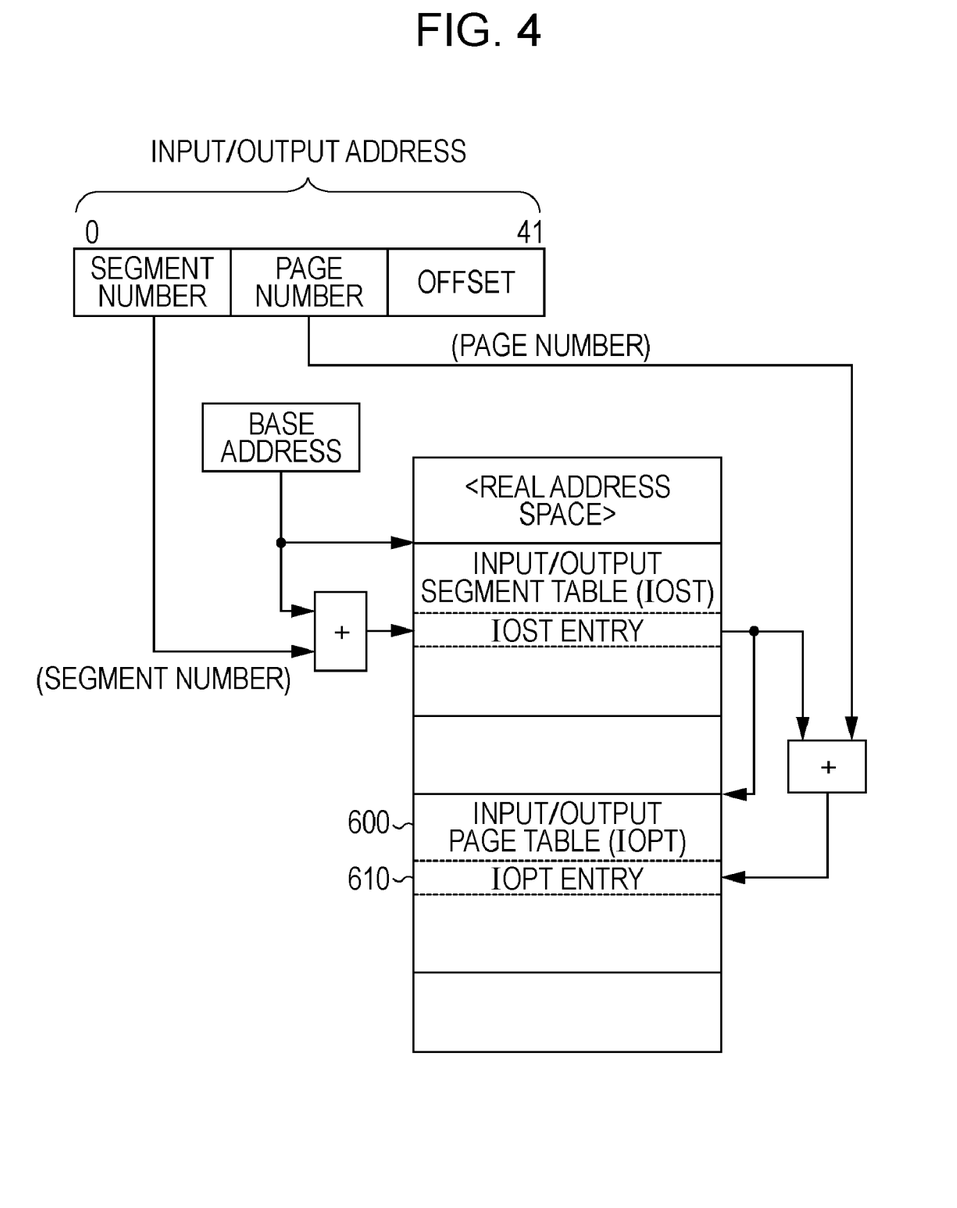
FIG. 4 is a diagram illustrating a conversion mechanism of input/output addresses in a processor cell.

FIG. 4 is a diagram illustrating a conversion mechanism of input/output addresses in a processor cell. Input/output addresses supplied from the host bridge device 100 are 42 bits in width, with the upper 14 bits denoting segment numbers. Page numbers are allocated to lower portions of the segment numbers and even lower portions thereof are offset. If a page size is 4 KB, a page number is 16 bits and an offset number is 12 bits. If a page size is 64 KB, a page number is 12 bits and an offset number is 16 bits. If a page size is 1 MB, a page number is 8 bits and an offset number is 20 bits. If a page size is 16 MB, a page number is 4 bits and an offset is 24 bits.

An input/output segment table (LOST) which retains attributes of segments and an input/output page table (IOPT) 600 which retains attributes of pages are placed in a real address space of the host memory 220.

Access can be made to an LOST entry of interest by adding a segment number to a base address of the input/output segment table. A base number of the input/output page table 600 is retained in the LOST entry, and access can be made to an IOPT entry 610 of interest by adding a page number to the LOST entry.

Figure 5:
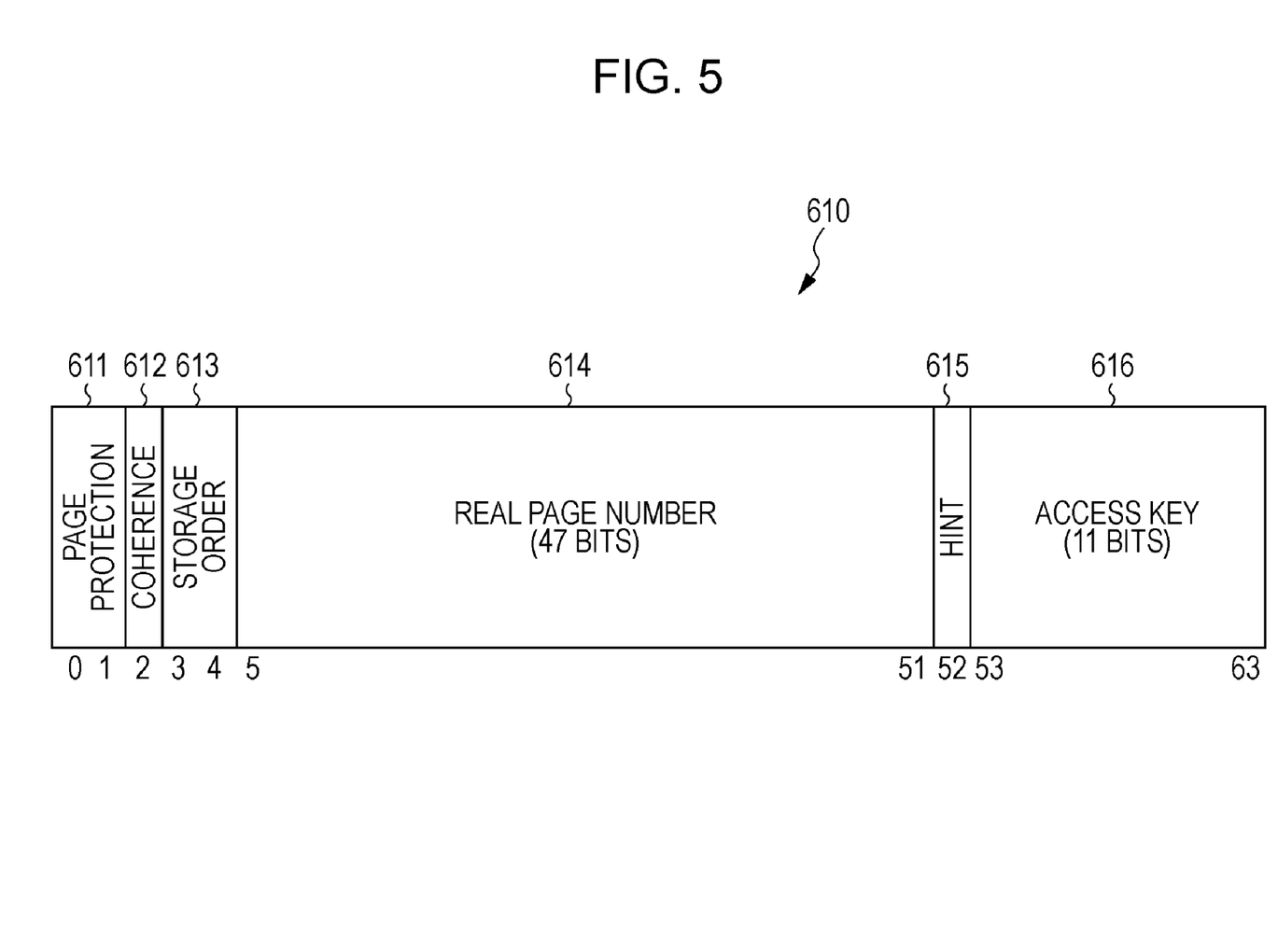
FIG. 5 is a diagram illustrating a field configuration of an IOPT entry.

FIG. 5 is a diagram illustrating a field configuration of the IOPT entry 610. Two bits, which are the zeroth bit and the first bit, in the IOPT entry 610 are a field indicating a page protection 611. In the page protection 611, "00" means that access is not allowed to be made to a corresponding page. "01" means that a corresponding page is only allowed to be read. "10" means that a corresponding page is only allowed to be written. "11" means that a corresponding page is allowed to be both read and written.

The second bit is a field of a coherence 612 indicating whether or not memory coherence is necessary. Two bits, which are the third bit and the fourth bit, are a field indicating a storage ordering 613. In this field, "00" means that completion of the preceding reading and writing before writing to a corresponding page is unnecessary. "10" means that completion of the preceding writing before writing to a corresponding page is necessary. "11" means that completion of the preceding reading and writing before reading from or writing to a corresponding page is necessary.

47 bits, which are the fifth to fifty-first bits, are a field indicating real page numbers 614 of a corresponding page. However, as it is assumed that input/output addresses have 42 bits in width, a zero value is properly set to an LSB side depending on a page size.

The fifty-second bit is a field indicating a hint 615. The hint 615 retains a value giving a hint on whether to retain an entry of cash of IOPT.

11 bits, which are the fifty-third to sixty-third bits, are a field indicating an access key 616 of a corresponding page. The access key 616 is compared with an access key supplied from the host bridge device 100, and, only when they match each other, is controlled by the host processor 210 to permit access to the corresponding page.

[Example of Configuration of Access Key Generating Unit 120]

Figure 6:
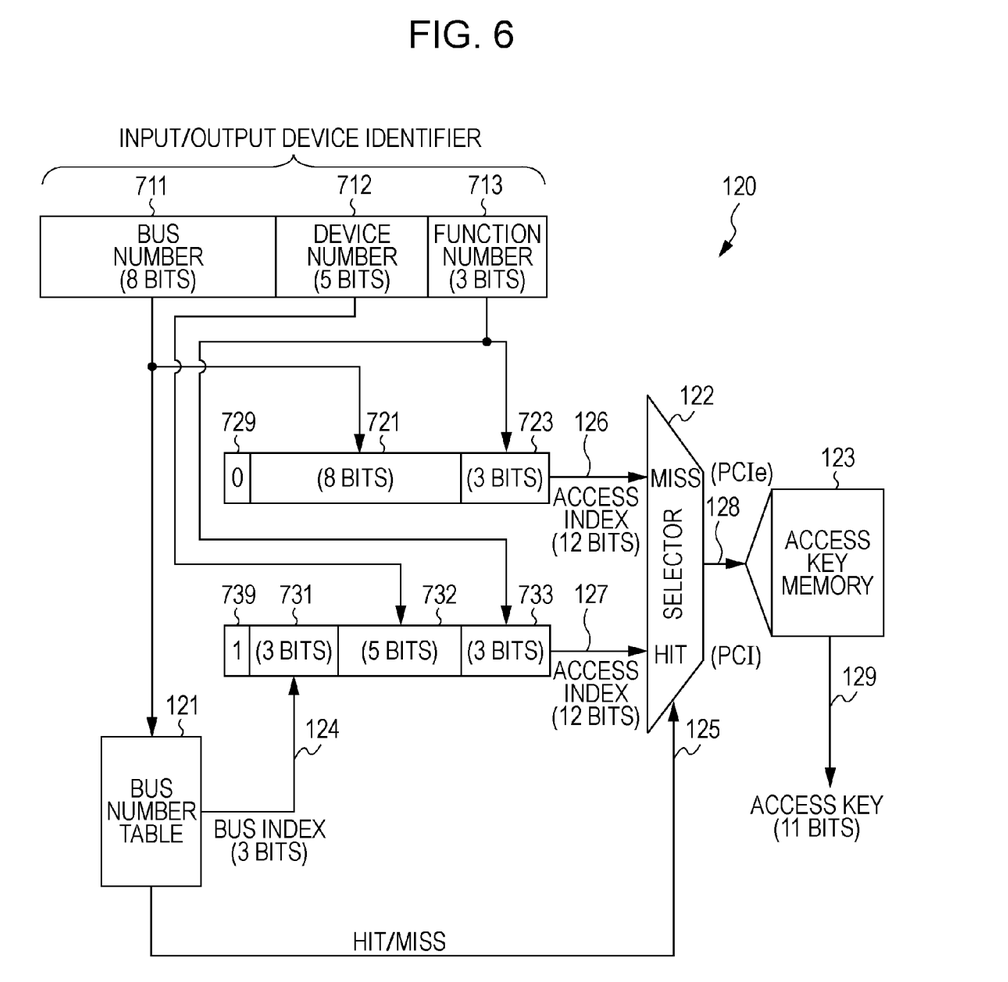
FIG. 6 is a diagram illustrating an example of the configuration of an access key generating unit according to the first embodiment of the present invention.

FIG. 6 is a diagram illustrating an example of the configuration of the access key generating unit 120 according to the first embodiment of the present invention. Upon receiving the input/output device identifier 710 from the PCI devices or the PCIe devices, the access key generating unit 120 retrieves the upper 8-bit bus number 711 from a bus number table 121. The bus number table 121 has the function to retrieve an entry matching the bus number 711 of the bus numbers retained in the entries, as will be described later. A selector 122 selects the output of one of signal lines 126 and 127 based on the content of a signal line 125 and outputs the selected output, as an access index, to a signal line 128. An access key memory 123 is a memory which stores "$2^{12}$", 11 bit-wide access keys.

If the entry matching the bus number 711 exists in the bus number table 121, its storage location is output as a bus index via a signal line 124. Assuming that the total number of entries in the bus number table 121 is 8, 3 bits are sufficient as the bus index. In addition, hit/miss signals to determine whether or not there exists any matching entry are output via the signal line 125. If the matching entry exists, the hit signal is output to the signal line 125, and if no matching entry exists, the miss signal is output to the signal line 125.

If the entry matching the bus number 711 exists in the bus number table 121, data 739 indicating a value "1" is followed by 3-bit data 731, 5-bit data 732 and 3-bit data 733 as access indexes. In this example, 3 bits from the bus number table 121 are set for data 731, 5 bits of the device number 712 are set for data 732, and 3 bits of the function number 713 are set for data 733, all of which are output to the signal line 127. That is, if the matching entry exists, since a signal on the signal line 125 is the hit signal, the selector 122 selects output of the signal line 127 and outputs it to a signal line 128.

If the entry matching the bus number 711 does not exist in the bus number table 121, data 729 indicating a value "0" is followed by 8-bit data 721 and 3-bit data 723 as access indexes. In this example, 8 bits of the bus number 711 are set for data 721 and 3 bits of the function number 713 are set for data 723, all of which are output to the signal line 126. That is, if the matching entry does not exist, since a signal on the signal line 125 is the miss signal, the selector 122 selects the output of the signal line 126 and outputs it to the signal line 128.

When an access index is supplied to the access key memory 123 via the signal line 128, the access key memory 123 indexes storage contents using the access index and outputs an access key to a signal line 129. This results in an 11-bit access key being generated in the input/output device identifier 710 of 16 bits. That is, for the PCIe devices, since only a single device corresponds to one bus, an access key is generated with the bus number and the function number as access indexes. On the other hand, for the PCI devices, since a plurality of devices may correspond to one bus, the bus number is treated to be reduced on the assumption that only 8 bits are sufficient as the bus number, although the device number is included in the access indexes. For that purpose, the 8-bit bus number is converted into a 3-bit bus index using the bus number table 121.

In addition, the bus number table 121 is an example of a bit field converting unit or a bus number converting unit recited in the claims. In addition, the access key memory 123 is an example of an access key retaining unit recited in the claims. In addition, the selector 122 is an example of an indexing unit recited in the claims.

[Example of Configuration of Bus Number Table 121]

Figure 7:
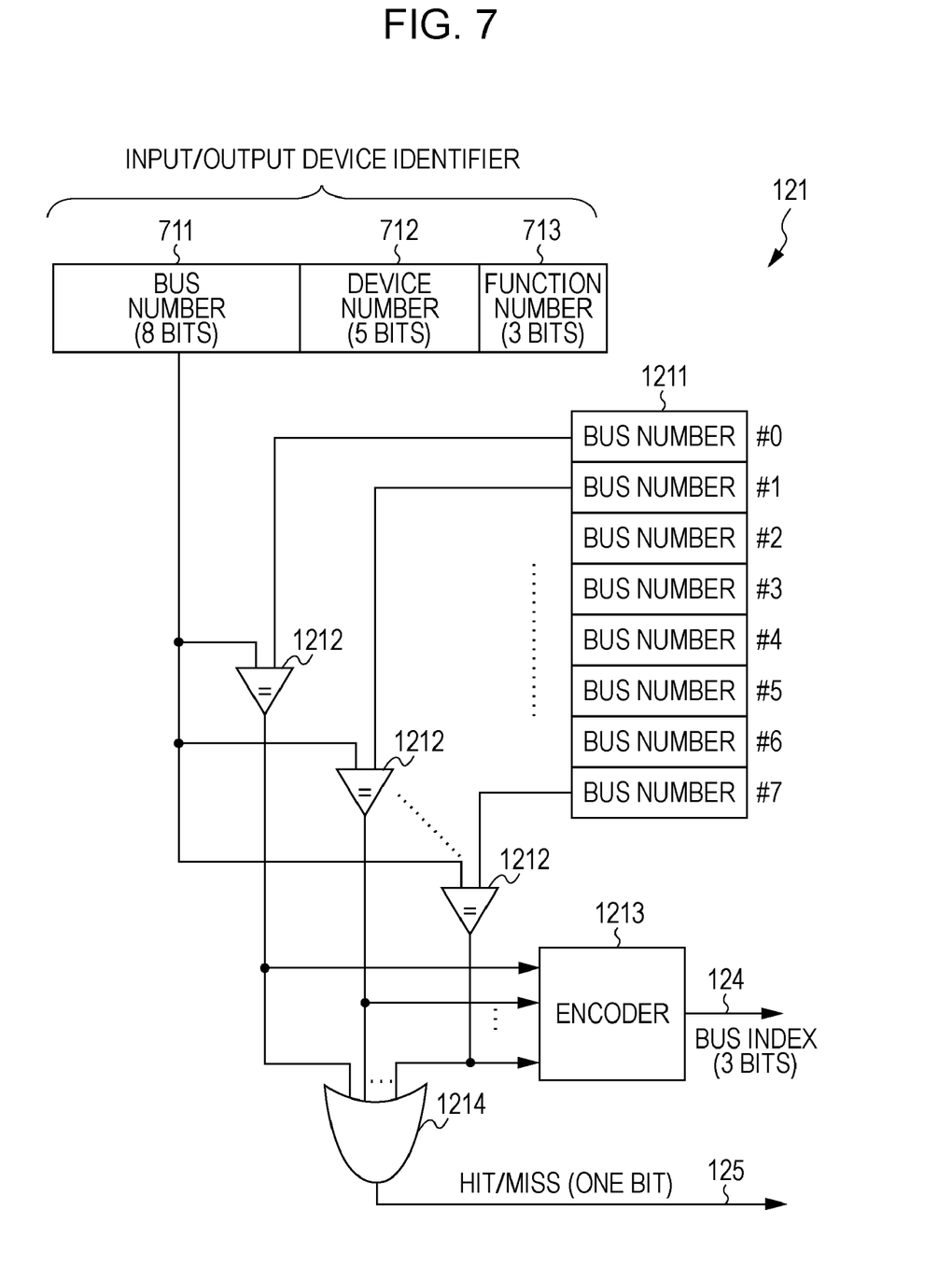
FIG. 7 is a diagram illustrating an example of the configuration of a bus number table according to the first embodiment of the present invention.

FIG. 7 is a diagram illustrating an example of the configuration of the bus number table 121 according to the first embodiment of the present invention. The bus number table 121 includes a bus number retaining unit 1211 having 8 entries, 8 comparators 1212, an encoder 1213 and a logic circuit 1214.

The bus number retaining unit 1211 retains bus numbers in its corresponding entries. It is assumed that a bus number of each entry in the bus number retaining unit 1211 is preset by privileged software or the like of an operating system, for example when a system starts up. Each of the comparators 1212 compares the bus number 711 of the input/output device identifier 710 with a bus number retained in each entry of the bus number retaining unit 1211 to detect a matching therebetween. The encoder 1213 encodes signals of 8 bits in total, which are output from the comparators 1212, and outputs the encoded signals, as a 3-bit bus index, to the signal line 124. The logic circuit 1214 generates a logical sum of the signals of 8 bits in total, which are output from the comparators 1212, and outputs the logical sum, as a hit/miss signal, to the signal line 125.

With such a configuration, the number of the entry matching the bus number 711 is output, as a bus index, to the signal line 124 and a hit/miss signal indicating whether or not an entry matching the bus number 711 exists is output to the signal line 125. The bus number table 121 may be implemented by other example configurations instead of having the above-described function. For example, it may be configured to search bus numbers using an existing content addressable memory (CAM).

[Example of Configuration of Access Key Memory 123]

Figure 8:
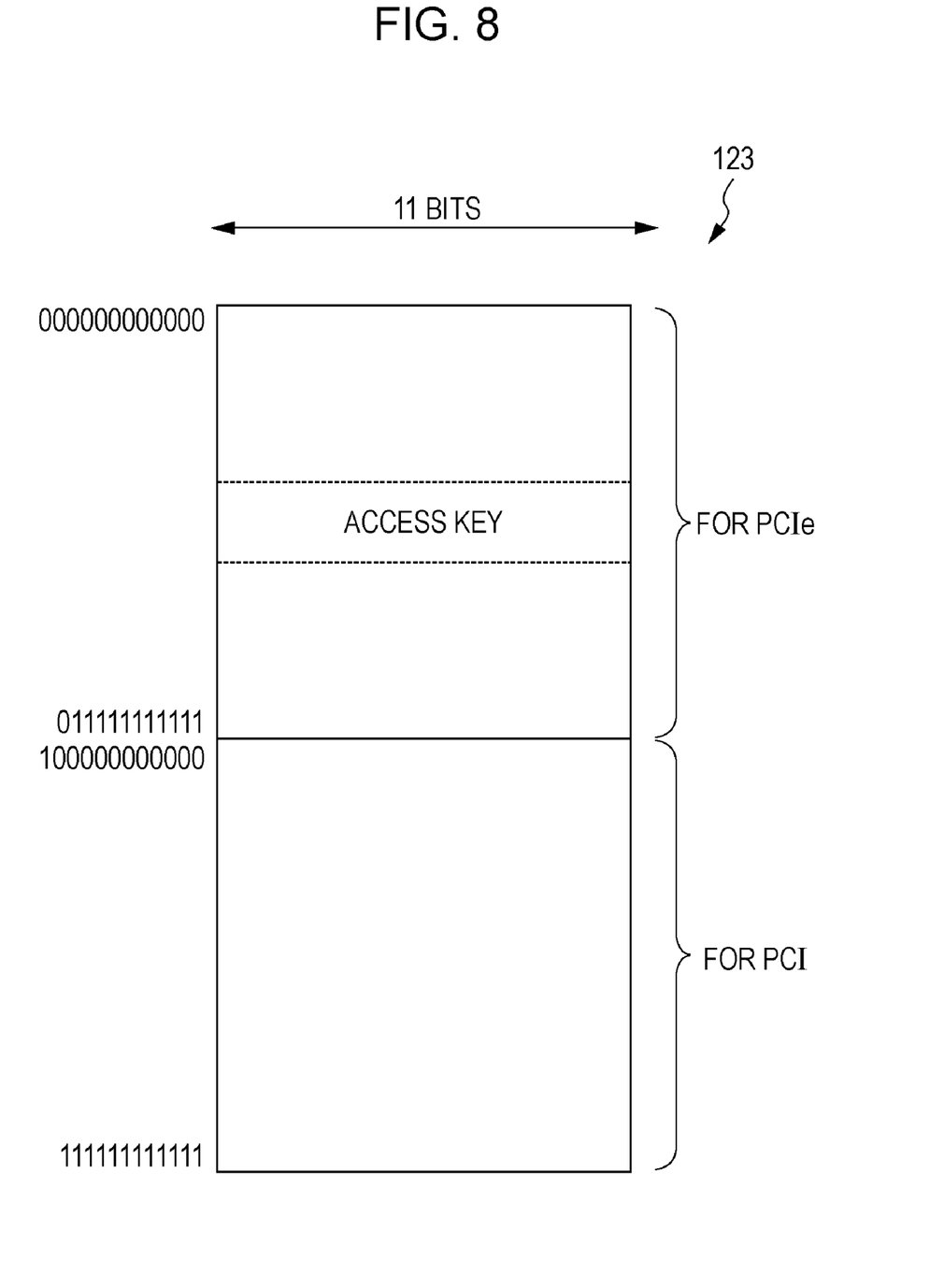
FIG. 8 is a diagram illustrating an example of the configuration of an access key memory according to the first embodiment of the present invention.

FIG. 8 is a diagram illustrating an example of the configuration of the access key memory 123 according to the first embodiment of the present invention. The access key memory 123 stores "$2^{12}$" 11 bit-wide access keys. The first half of the "$2^{11}$" access keys are access keys for PCIe devices and the second half of the "$2^{11}$" access keys are access keys for PCI devices.

For example, if an access index output from the selector 122 ranges from "000000000000" to "011111111111," an access key for PCIe is read out. On the other hand, if an access index output from the selector 122 ranges from "100000000000" to "111111111111," an access key for PCI is read out.

The access key memory 123 has the capacity of 44 K bits (=11 bits×$2^{12}$ words) to store "$2^{12}$", 11 bit-wide access keys.

[Advantages of First Embodiment]

In this manner, according to the first embodiment of the present invention, it is possible to generate 11-bit access keys based on the 16-bit input/output device identifier. In the first embodiment, access keys are generated using properties of PCI bus and PCIe bus, without improperly limiting addresses usable by peripheral devices. In addition, it is possible to allocate the same access key for one group of multiple devices.

Here, in comparison with memory capacity when a conversion from 16 bits to 11 bits is made according to a table conversion scheme, if a correspondence table between the 16-bit input/output device identifier and the 11-bit access key is provided, the capacity of 704 K bits (=11 bits×$2^{16}$ words) is achieved. On the other hand, according to the first embodiment of the present invention, as described above, the capacity of 44 K bits is achieved, making it possible to generate access keys with 1/16 of the memory capacity according to the table conversion scheme.

2. Second Embodiment

Figure 9:
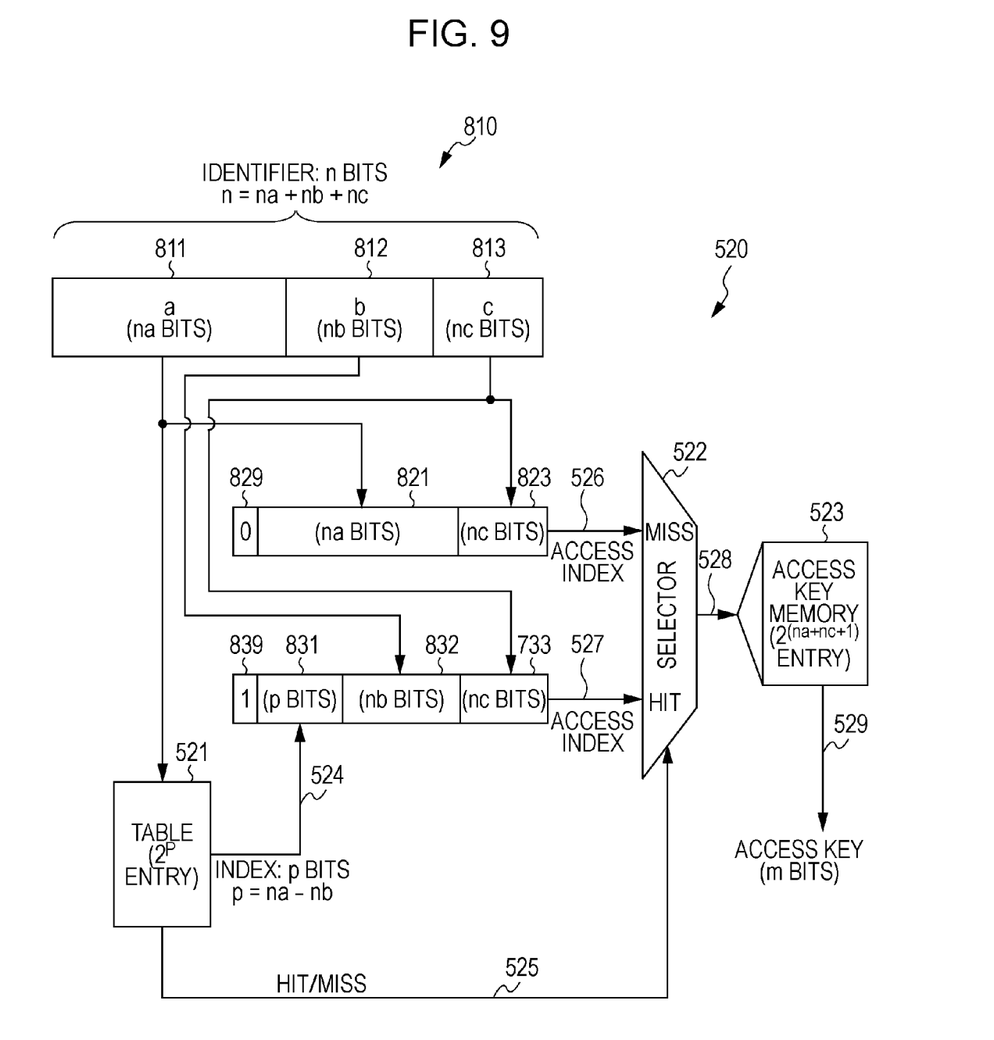
FIG. 9 is a diagram illustrating an example of the configuration of an access key generating unit according to a second embodiment of the present invention.

Although the example implementation for the information processing system including PCI devices and PCI-Express devices has been illustrated in the above first embodiment, the present invention is applicable to a general information processing system. Here, an example of the configuration of the access key generating unit 120 will be described with the application of the present invention to the general information processing system.

[Example of Configuration of Access Key Generating Unit 520]

FIG. 9 is a diagram illustrating an example of configuration of an access key generating unit 520 according to a second embodiment of the present invention. The access key generating unit 520 has an n-bit (n being an integer) identifier 810 as its input. The n-bit identifier 810 includes upper na-bit (na being an integer) data a811, followed by nb-bit (nb being an integer) data b812 and lower nc-bit (nc being an integer) data c813. When the n-bit data is input, the data a811 is retrieved from a table 521. The table 521 has the function to retrieve an entry matching the data a811 of data retained in each entry. A selector 522 selects the output of one of signal lines 526 and 527 based on the content of a signal line 525 and outputs the selected output, as an access index, to a signal line 528. An access key memory 523 is a memory which stores "$2^{(na+nc+1)}$", m (m being an integer, m<n) bit-wide access keys.

If an entry matching the data a811 exists in the table 521, its storage location is output as an index via a signal line 524. Assuming that the total number of entries in the table 521 is "$2^p$," p (p=na−nb: integer) bits are sufficient as the bus index. In addition, hit/miss signals to determine whether or not any matching entry exists are output via the signal line 525. If the matching entry exists, the hit signal is output to the signal line 525, and if no matching entry exists, the miss signal is output to the signal line 525.

If the entry matching the data a811 exists in the table 521, data 839 indicating a value "1" is followed by p-bit data 831, nb-bit data 832 and nc-bit data 833 as access indexes. In this example, p bits from the table 521 are set for data 831, nb bits of the data b812 are set for data 832, and nc bits of the data c813 are set for data 833, all of which are output to the signal line 527. That is, if the matching entry exists, since a signal on the signal line 525 is the hit signal, the selector 522 selects the output of the signal line 527 and outputs it to a signal line 528.

If the entry matching the data a811 does not exist in the table 521, data 829 indicating a value "0" is followed by na-bit data 821 and nc-bit data 823 as access indexes. In this example, na bits of the data a811 are set for data 821 and nc bits of the data c813 are set for data 823, all of which are output to the signal line 526. That is, if the matching entry does not exist, since a signal on the signal line 525 is the miss signal, the selector 522 selects the output of the signal line 526 and outputs it to the signal line 528.

When an access index is supplied to the access key memory 523 via the signal line 528, the access key memory 523 indexes storage contents using the access index and outputs an access key to a signal line 529. This results in an m-bit access key being generated in the n-bit identifier 810.

In this manner, according to the second embodiment of the present invention, it is possible to generate the m-bit access key based on the n-bit identifier (n>m).

The present application contains subject matter related to that disclosed in Japanese Priority Patent Application JP 2009-010488 filed in the Japan Patent Office on Jan. 21, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An access key generating apparatus comprising:
   a bit field converting unit which converts a partial bit field, as a portion of a bit field indicating a device identifier of peripheral devices, into a reduced bit field having a bit width shorter than a bit width of the partial bit field;
   an access key retaining unit which retains a plurality of access keys to control access to a memory from the peripheral devices in association with each of the peripheral devices;
   an indexing unit which indexes the access keys from the access key retaining unit using an index address including the reduced bit field if the conversion of the partial bit field into the reduced bit field is successful, and indexes the access keys from the access key retaining unit using an index address including the partial bit field if the conversion of the partial bit field into the reduced bit field is unsuccessful;
   wherein the device identifier includes the bus number and a device number, and
   wherein the indexing unit indexes the access keys from the access key retaining unit using an index address including the reduced bus number and the device number if the conversion of the bus number into the reduced bus number is successful, and indexes the access keys from the access key retaining unit using an index address including the bus number if the conversion of the bus number into the reduced bus number is unsuccessful.

2. An access key generating apparatus comprising:
   a bus number converting unit which converts a bus number, as a portion of a bit field indicating a device identifier of peripheral devices, into a reduced bus number having a bit width shorter than a bit width of the bus number;
   an access key retaining unit which retains a plurality of access keys to control access to a memory from the peripheral devices in association with each of the peripheral devices;
   an indexing unit which indexes the access keys from the access key retaining unit using an index address including the reduced bus number if the conversion of the bus number into the reduced bus number is successful, and indexes the access keys from the access key retaining unit using an index address including the bus number if the conversion of the bus number into the reduced bus number is unsuccessful;
   wherein the device identifier includes the bus number, a device number and a function number, and
   wherein the indexing unit indexes the access keys from a region of the access key retaining unit, the region being specified from the reduced bus number, the device number and the function number if the conversion of the bus number into the reduced bus number is successful, and indexes the access keys from a region of the access key retaining unit, the region being specified from the bus number and the function number if the conversion of the bus number into the reduced bus number is unsuccessful.

3. An information processing apparatus comprising:
   a bit field converting unit which converts a partial bit field, as a portion of a bit field indicating a device identifier of peripheral devices, into a reduced bit field having a bit width shorter than a bit width of the partial bit field;
   an access key retaining unit which retains a plurality of access keys to control access to a memory from the peripheral devices in association with each of the peripheral devices;
   an indexing unit which indexes the access keys from the access key retaining unit using an index address including the reduced bit field if the conversion of the partial bit field into the reduced bit field is successful, and indexes the access keys from the access key retaining unit using an index address including the partial bit field if the conversion of the partial bit field into the reduced bit field is unsuccessful;

a memory access control unit which uses the indexed access keys to control access to the memory;

wherein the device identifier includes the bus number, a device number and a function number, and wherein the indexing unit indexes the access keys from a region of the access key retaining unit, the region being specified from the reduced bus number, the device number and the function number if the conversion of the bus number into the reduced bus number is successful, and indexes the access keys from a region of the access key retaining unit, the region being specified from the bus number and the function number if the conversion of the bus number into the reduced bus number is unsuccessful.

4. An information processing apparatus comprising:

a bus number converting unit which converts a bus number, as a portion of a bit field indicating a device identifier of peripheral devices, into a reduced bus number having a bit width shorter than a bit width of the bus number;

an access key retaining unit which retains a plurality of access keys to control access to a memory from the peripheral devices in association with each of the peripheral devices;

an indexing unit which indexes the access keys from the access key retaining unit using an index address including the reduced bus number if the conversion of the bus number into the reduced bus number is successful, and indexes the access keys from the access key retaining unit using an index address including the bus number if the conversion of the bus number into the reduced bus number is unsuccessful;

a memory access control unit which uses the indexed access keys to control access to the memory;

wherein the bus number converting unit includes a plurality of entries which retains the bus number, and wherein the bus number converting unit determines that the conversion of the bus number into the reduced bus number is successful if the bus number to be converted is retained in one of the entries and then outputs a number uniquely granted to the one entry as the reduced bus number, and determines that the conversion of the bus number into the reduced bus number is unsuccessful if the bus number to be converted is not retained in any of the entries.

* * * * *